Sept. 4, 1945.  W. R. TUCKER  2,384,218

HYDRAULIC TRANSMISSION

Filed May 31, 1941  4 Sheets-Sheet 1

INVENTOR
WARREN R. TUCKER
ATTORNEYS

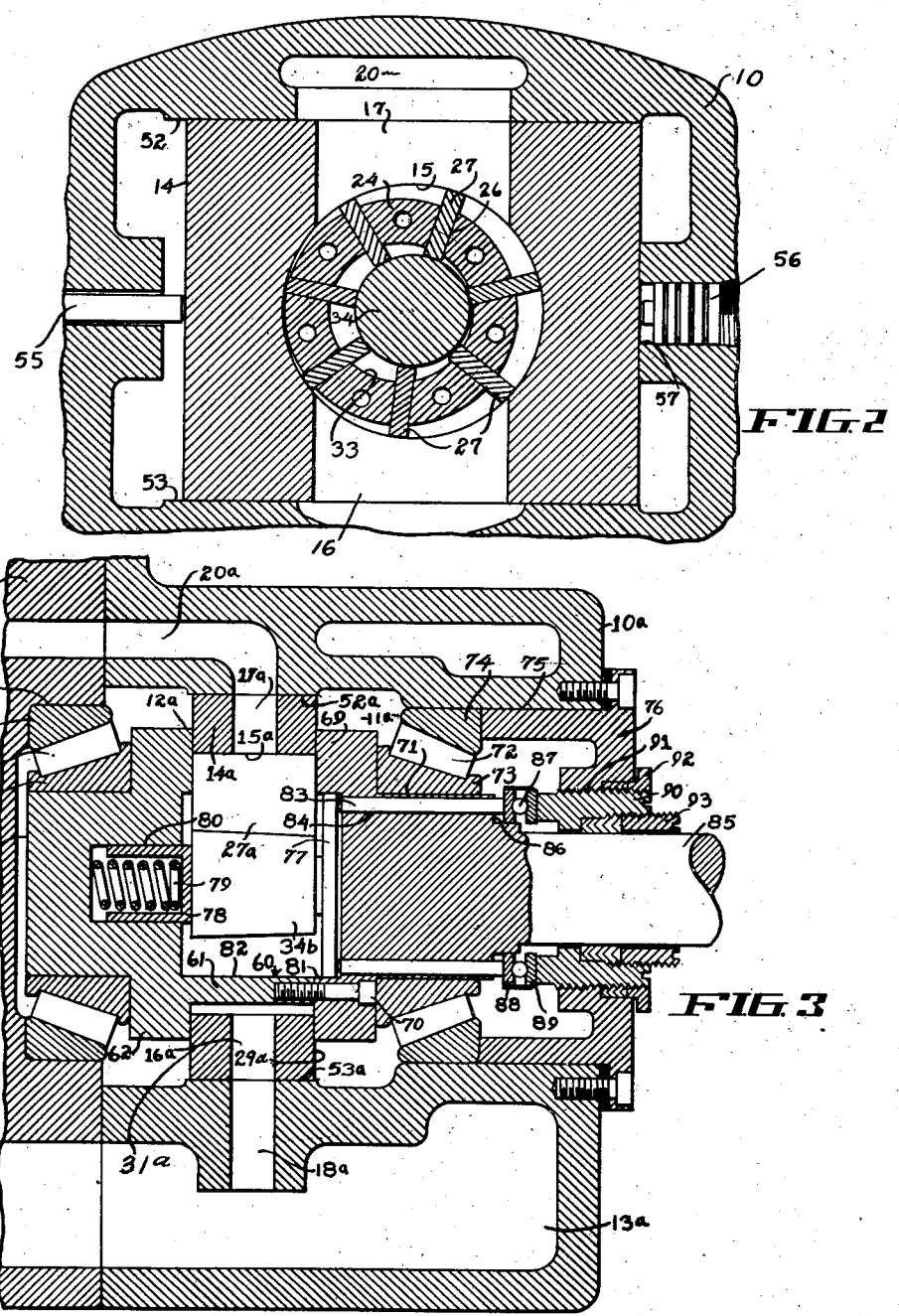

Sept. 4, 1945.  W. R. TUCKER  2,384,218
HYDRAULIC TRANSMISSION
Filed May 31, 1941  4 Sheets-Sheet 3

INVENTOR
WARREN R. TUCKER
Toulmin & Toulmin
ATTORNEYS

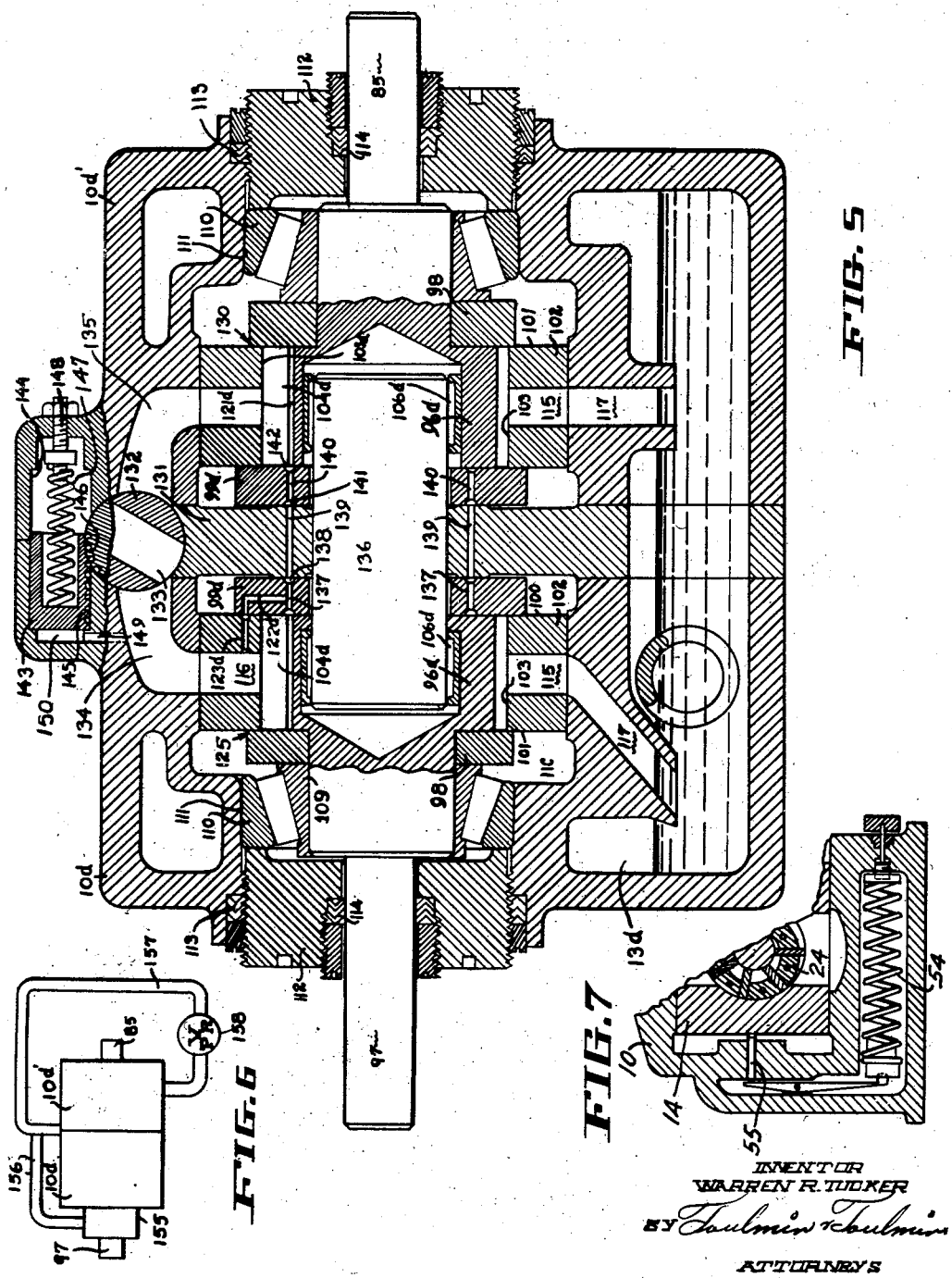

Patented Sept. 4, 1945

2,384,218

UNITED STATES PATENT OFFICE 2,384,218

HYDRAULIC TRANSMISSION

Warren R. Tucker, Oakwood, Ohio, assignor to The Hydraulic Development Corporation, Inc., Wilmington, Del., a corporation of Delaware Application May 31, 1941, Serial No. 396,032

7 Claims. (Cl. 60—53)

This invention relates to hydraulic transmissions.

An object of the invention is to provide a compact unitary structure of pump and motor for a hydraulic transmission.

Another object of the invention is to provide a hydraulic transmission wherein the pump and motor thereof are combined in a single casing, and wherein the liquid for circulation between the pump and motor is confined within the pump casing.

Another object of the invention is to provide a hydraulic transmission wherein the pump and motor are identical units supported from a common dividing wall separating the pump from the motor.

Another object of the invention is to provide a vane pump which can be used for either the pump or motor of a hydraulic transmission.

Another object of the invention is to provide a vane pump for a hydraulic transmission which can be used as either the pump or motor having means for positive actuation of the vanes.

It is another object of the invention to provide a hydraulic transmission in accordance with the foregoing object wherein the positive actuating means consists of a floating central plug in engagement with the inner ends of the vanes.

Another object of the invention is to provide a hydraulic transmission in accordance with the previous object wherein the plug is tapered and means are provided for moving the pump or motor with respect to the actuating plug thereof for adjusting the position of the vanes within the pump or motor.

Another object of the invention is to provide a hydraulic transmission wherein vane pumps are used as the pump and motor having means for adjusting the position of the vanes within the pump by movement of the entire pump or motor assembly.

Another object of the invention is to provide a hydraulic transmission using vane pumps as the pump and motor thereof having means for hydraulically retaining the vanes in engagement with their respective operating cylinders.

Another object of the invention is to provide a hydraulic transmission using vane pumps as the pump and motor thereof wherein the rotors of the pump and motor are supported from a common bearing shaft.

It is another object of the invention to provide a hydraulic transmission using identical vane pump units for the pump and motor wherein the rotors of the pump and motor are supported by a stub shaft carried by a common dividing wall between the pump and motor units.

Another object of the invention is to provide vane pump units as the pump and motor of a hydraulic transmission positioned adjacent each other and bearinged upon a common shaft to provide a compact unitary transmission.

A further object of the invention is to provide a hydraulic transmission using vane pumps for the pump and motor thereof wherein the vanes are retained in engagement with their respective cylinder walls by means of a mechanical actuator.

Another object of the invention is to provide a transmission in accordance with the foregoing object wherein the pump assembly is adjustable with respect to the mechanical actuator to control the clearance between the vanes and the cylinder walls of the pump and motor units.

Another object of the invention is to provide a hydraulic transmission wherein the mechanical actuator for the vane pump is adjustable from the exterior of the pump.

Another object of the invention is to provide a hydraulic transmission using vane pumps as the pump and motor thereof wherein the motor pump is provided with a mechanical vane actuator while the power pump is provided with hydraulic means for actuating the vanes and retaining the same in engagement with the pump cylinder wall.

Another object of the invention is to provide a transmission wherein the vane pumps thereof acting as pump and motor are provided with hydraulic means for maintaining the vanes in engagement with their respective cylinder walls, and wherein means is provided for establishing positive hydraulic pressure to the vanes of the motor to insure engagement thereof with the cylinder walls.

Another object of the invention is to provide a transmission in accordance with the foregoing object wherein valve means are provided in the passage between the pump and motor of the transmission for establishing positive pressure under the vanes of the motor before permitting flow therethrough.

Another object of the invention is to provide a hydraulic transmission wherein the vane pumps acting as pump and motor are provided with hydraulic means for retaining the vanes in engagement with the respective cylinder walls, and wherein the hydraulic pressure to the under side is maintained substantially constant.

Another object of the invention is to provide a pump in accordance with the foregoing object wherein the positive pressure is produced by means of a pilot pump.

Another object of the invention is to provide a transmission in accordance with the previous object wherein the positive pressure produced by the pilot pump is overcome by the pressure produced within the transmission when the pressure in the transmission reaches a predetermined limit to permit the vanes thereof to collapse and thus act as a pressure safety device.

Further objects and advantages will become apparent from the drawings and the following description.

In the drawings:

Figure 2 is a transverse cross-sectional view taken substantially along line 2—2 of Figure 1.

Figure 3 is a longitudinal cross-sectional view of the motor unit similar to the motor unit of Figure 1 but showing a modified apparatus for adjusting the mechanical actuator for the vanes of the vane pump acting as either motor or pump of the transmission.

Figure 5 is a longitudinal cross-sectional view of another modified form of the invention showing hydraulic means for providing positive actuation of the vanes of both pump and motor and wherein means is provided for establishing positive pressure to the vanes of the motor before permitting liquid flow therethrough.

Figure 6 is a diagrammatic representation of the pump of Figure 5 showing the manner of using the pilot pump for establishing positive pressure to the vanes of the pump and motor of the transmission.

Figure 7 is a small, transverse, cross-sectional view of the pump illustrated in Figures 1 and 2 of the drawings.

Figure 1:
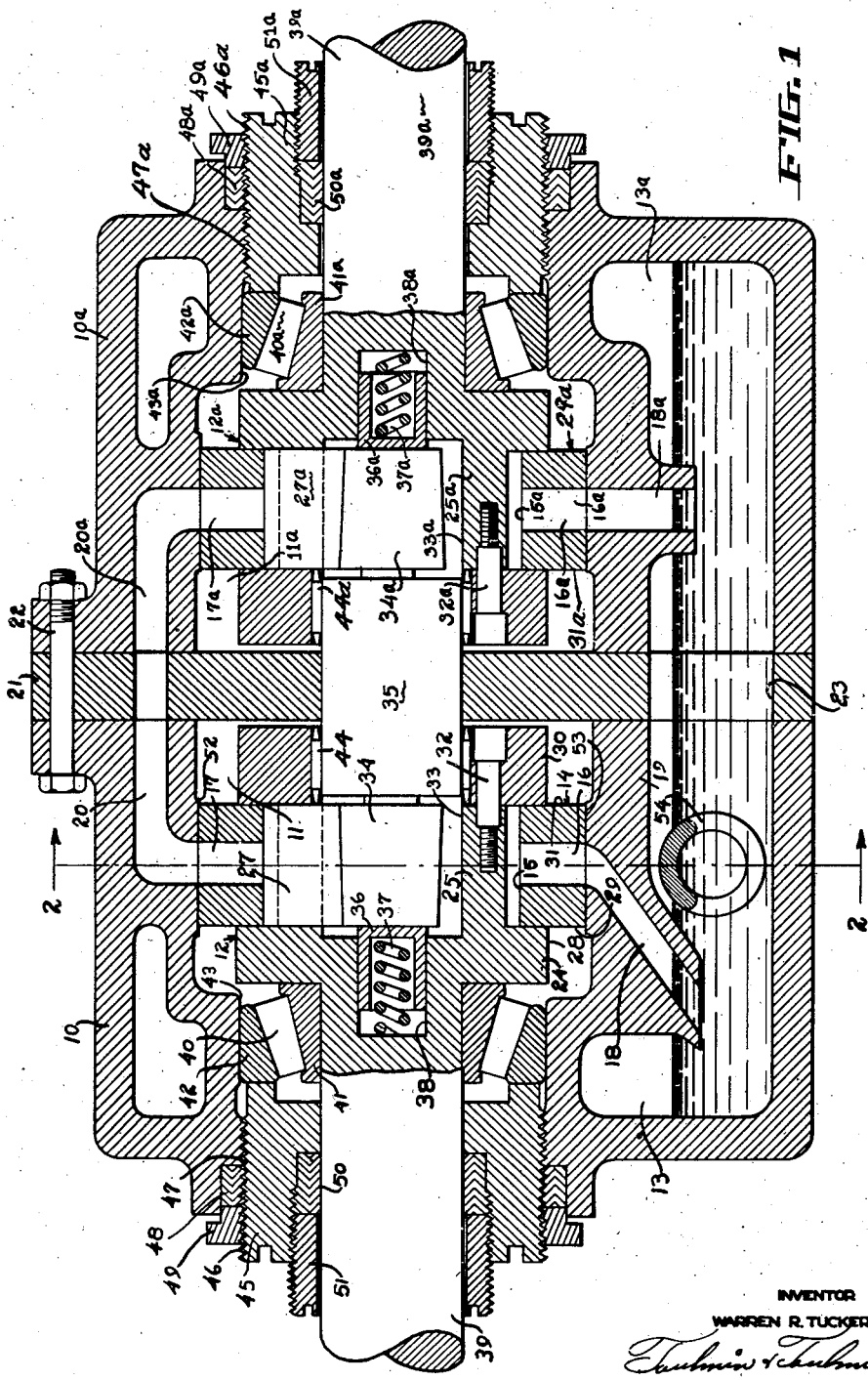
Figure 1 is a longitudinal cross-sectional view of a hydraulic transmission of this invention using vane pumps with mechanically actuated vane devices.

In this invention the hydraulic transmission, shown in Figures 1 and 2, consists of identical units which are separated by a wall member and upon which they are carried for providing a compact unit arrangement of pump and motor for a hydraulic transmission. The casing of the transmission is suitably cored in the lower portion thereof for receiving liquid which is circulated by the pump to the motor. With the actuating liquid carried within the pump casing the transmission becomes a complete unit structure which can be readily connected between any source of power and a driven apparatus.

Since the motor and pump units of the transmission are of identical construction in Figures 1 and 2 it will be necessary to describe only one of the units. The pump unit will be particularly described since it has a control element associated therewith which is not required for use in combination with the motor unit, it being understood that in all respects other than for the control element the pump and motor units are of like construction. The elements of the motor unit comparable with the elements of the pump unit will be designated with the same numeral as the element of the pump unit but with the suffix "a."

The pump unit consists of a casing 10 having a working chamber 11 within which a vane type pump unit 12 is positioned. A second chamber 13 is provided in the lower portion of the casing 10 and is arranged to receive the liquid used for circulation between the pump and the motor unit of the hydraulic transmission.

The pump unit 12 consists of a cylinder 14 which is substantially rectangular as to its exterior shape and is provided with an internal cylindrical bore 15. The cylinder 14 is provided with an inlet flow passage 16 and an outlet flow passage 17. The inlet passage 16 communicates with a passage 18 provided in the internal wall 19 within the pump casing 10. The outlet passage 17 communicates with a passage 20 provided within the wall of the casing 10, which passage 20 communicates with the passage 20a for the motor unit 12a. The passage 17a of the motor unit 12a is the inlet passage for the same, while the passage 16a is the outlet passage communicating with the return passage 18a to the chamber 13a.

The casings 10 and 10a are positioned adjacent opposite sides of a dividing wall 21 and are secured together and to the wall 21 by means of suitable bolts 22. The dividing wall 21 is provided with a passage 23 which permits flow communication between the chambers 13 and 13a whereby the bottom portion of the housings 10 and 10a provides a storage chamber for circulating liquid.

The pump unit 12 includes a rotor 24 having a cylindrical portion 25 positioned within the cylindrical bore 15 of the cylinder 14 and arranged for rotation therein. The cylindrical portion 25 has a plurality of slots 26 positioned radially therein within each of which a vane 27 is carried. The body of the rotor 24 has a flanged portion 28 which engages the planar surface 29 provided on the cylinder 14 to close one side of the cylindrical chamber 15. A plate member 30 is positioned adjacent the planar surface 31 provided on the opposite side of the cylinder 14 and is secured to the cylindrical portion 25 of the rotor 24 by means of the bolts 32.

To retain the vanes 27 in engagement with the cylindrical bore 15 of the cylinder 14 a mechanical actuator is positioned within the cylindrical bore 33 provided in the rotor 24. The actuator consists of a cylindrical plug 34 which is slightly conical in shape. The vanes 27 have their inner edges tapered to match the taper of the mechanical actuator 34. One end of the mechanical actuator 34 engages a stub shaft 35 secured within the dividing wall 21. The opposite end of the mechanical actuator is engaged by a piston member 36 which is pressed against the end of the actuator by means of the spring 37. The piston 36 and spring 37 are carried within a cylindrical bore 38 provided in the rotor 24.

The rotor 24 has a drive shaft 39 as an integral part thereof which extends through the casing 10 and is adapted to be connected to a suitable source of power, such as an electric motor. The shaft 39 is carried upon the tapered roller bearing 40 one race 41 of which is positioned upon the shaft 39 while the other race 42 is carried within the cylindrical bore 43 provided in the casing 10. The tapered roller bearing 40 thus provides bearing means for one end of the rotor 24. The opposite end of the rotor 24 is bearinged upon the stub shaft 35 through means of the needle bearings 44 suitably positioned within the end plate 30.

The shaft 39 extends through a sealing and adjusting mechanism carried within the end wall of the casing 10. The adjusting mechanism consists of a plug 45 having a threaded exterior 46 which is in threaded engagement with a threaded opening 47 provided in the casing 10. The inner end of the plug 45 engages the race 42 of the tapered roller bearing 40 whereby rotation of the plug 45 in the threaded opening 47 moves the pump unit 12 with respect to the mechanical actuator 34 to cause the vanes 27 to ride on a higher portion of the taper of the mechanical actuator 34 and thereby adjust the clearance between the outer ends of the vanes 27 and the cylinder wall 15. Since the mechanical actuator 34 is in engagement with the stationary stub shaft 35 it is thus possible to move the entire pumping unit 12 with respect to the mechanical actuator 34 to obtain the required adjustment for operating clearance between the vanes 27 and the cylinder wall 15. If, when making the adjustment, the pumping unit 12 should be forced inwardly too far and thus cause binding between the vanes 27 and the cylinder wall 15 the plug 45 can be slightly retracted to relieve the binding condition. Under this condition the spring 37 will retain the mechanical actuator 34 against the stub shaft 35 to permit the vanes 27 to slide with respect to actuator 34 and thus relieve the binding condition.

The adjusting plug 45 is surrounded with a packing gland 48 which is retained in position by means of a packing nut 49. The shaft 39 extends through the adjusting plug 45. A packing gland 50 is provided between the shaft 39 and the plug 45 which is retained in compressed condition by means of the packing nut 51.

The cylinder 14 is slidably retained between the parallel surface 52 and 53 provided in the casing 10, see Figure 2, to permit the eccentricity of the cylinder to be varied with respect to the rotor 24 whereby the capacity of the pump 12 is controlled. The cylinder 14 can be shifted manually or by suitable automatic means to obtain the desired speed output from the hydraulic transmission. The control members may consist of a spring 54 adapted to be connected to a plunger 55 which urges the cylinder toward eccentric or full stroke position. A plunger 56 is positioned within a bore 57 for opposing the action of the spring 54 and the plunger 55. The plunger 56 can be either manually operated or suitable automatic mechanism can be connected thereto for shifting the cylinder 14 against the action of the plunger 55.

The vane pump 12 withdraws liquid from the reservoir of liquid stored in the chamber 13 through the passages 18 and 19 and discharges the same into the passages 17 and 20. The liquid is then conducted from the passage 20 into the passage 20a and admitted into the motor pump 12a through the passage 17a. The liquid expends its force upon the vanes within the pump 12a and discharges through the passage 18a. By varying the stroke of the pump 12 through reciprocation of the cylinder 14 with respect to the rotor 24 the volume of fluid delivered to the motor 12a is varied and thus the speed of the motor is controlled. The motor 12a can also be provided with a stroke control mechanism whereby additional control over the speed of operation of the motor 12a can be obtained.

Since the pump and the motor are of identical construction it can be seen that a single unit structure can be produced and two units of structure can be combined to provide a relatively compact transmission. The placement of the rotors adjacent each other so that they are bearinged upon a common stub shaft upon opposite sides of a dividing partition provides means for compacting the apparatus and reducing the overall dimensions.

The shaft 39 has been described with regard to the pump 12 as the drive shaft for the pump 12. It is to be understood however that the shaft 39a of the motor 12a is not a drive shaft but is a power transmitting shaft which is connected to the apparatus adapted to be driven by means of the hydraulic transmission.

In Figure 3 there is shown a modification of a motor unit wherein the adjusting mechanism for the mechanical actuator moves the actuator with respect to the pumping mechanism rather than moving the pump or motor with respect to the mechanical actuator as previously described with regard to Figure 1. In this modification the elements which are similar to the elements of Figure 1 will be referred to with the same numerals as used in Figure 1, the modified structure being additionally described.

In this form of the apparatus the casing 10a is provided with a working chamber 11a in which the motor unit 12a is positioned. The motor unit consists of the cylinder 14a having an inlet passage 17a and an outlet passage 16a. The cylinder is reciprocably mounted between the parallel surfaces 52a and 53a provided upon opposite walls of the working chamber 11a. The inlet passage 17a connects with the passage 20a which is in communication with the discharge passage from a similar pump unit associated with the motor unit 12a. The discharge passage 18a conducts fluid from the motor unit 12a into the fluid reservoir 13a.

The cylinder 14a is provided with a rotor 60 which has a cylindrical portion 61 positioned within the bore 15a of the cylinder 14a. The flanged portion 62 is integral with the portion 61 and engages the planar surface 31a of the cylinder 14a for closing one side thereof. The rotor 60 includes a reduced diameter portion 63 which carries a tapered roller bearing 64 one race 65 of which is positioned upon the reduced diameter portion 63 and the other race 66 is carried within a recess 67 provided in the dividing plate 68. The dividing plate 68 separates the motor unit 12a from a cooperating pump unit positioned upon the opposite side of the plate 68.

A closure plate 69 engages the planar surface 29a of the cylinder 14a for closing the cylinder and is secured to the cylindrical portion 61 of the rotor 60 by means of the bolts 70. The closure plate 69 has a reduced diameter portion 71 which carries a tapered roller bearing 72 the inner race 73 of which is carried upon the reduced diameter portion 71 and the outer race 74 is carried within a cylindrical bore 75 provided in the casing 10a. The tapered roller bearing 72 is retained in position within the bore 75 by means of an end closure plate 76.

The vanes 27a carried within radial slots provided in the cylindrical portion 61 of the rotor 60 have their outer ends in engagement with the cylinder wall 15a and their inner ends in engagement with a mechanical actuator 34b. The actuator 34b is similar to that described with regard to the actuator 34 of Figure 1 and performs the same function of retaining the outer ends of the vanes 27a in engagement with the cylinder wall 15a. The mechanical actuator 34b has one end thereof in engagement with an adjusting plate 77. The opposite end of the mechanical actuator is engaged by a piston 78 pressed against the actuator by means of a spring 79 for retaining the opposite end of the actuator 34b in engagement with the adjusting plate 77. The piston 78 and the spring 79 are carried within a bore 80 provided in the reduced diameter portion 63 of the rotor 60.

The adjusting plate 77 is positioned within a recess 81 provided within the closure plate 69 which recess cooperates with a recess 82 in the rotor 60 wherein the mechanical actuator 34 can operate.

The adjusting mechanism for the mechanical actuator 34b consists of a plurality of pins 83 extending through bores 84 provided in the reduced diameter portion 71 of the end closure plate 69. The power take off shaft 85 of the motor 12a is of smaller diameter than the portion 71 of the end plate 69 whereby a shoulder 86 is provided. The pins 83 extend through the shoulder 86 and engage the inner race 88 of the ball bearing 87. The outer race 89 of the ball bearing 87 is engaged by an adjusting plug 90 which is in threaded engagement with a suitable threaded opening 91 in the end closure plate 76. A packing gland 92 is provided between the adjusting plug 90 and the closure plate 76 while a packing gland 93 is provided between the adjusting plug 90 and the power take off shaft 85.

When the adjusting plug 90 is rotated the pins 83 will be moved inwardly or outwardly with respect to the mechanical actuator 34b whereby the tapered wall of the mechanical actuator cooperating with the tapered inner ends of the vanes 27 will adjust the clearance between the outer ends of the vanes 27 and the cylinder wall 15a. The spring 79 will cause the actuator 34b to follow the movement of the adjusting plate 77.

While the description of Figure 3 has been made with reference to the motor unit of a hydraulic transmission it is to be understood that the pump unit can be made identical with the motor unit and positioned upon the opposite side of the dividing plate 68. Either or both the pumping unit and the motor unit can have their cylinders adjustable to vary the eccentricity between the cylinder and the rotor for controlling the speed output of the transmission. Such control features have heretofore been referred to with regard to Figure 1 and it is therefore not believed necessary to specifically set forth the controls with regard to Figure 3 since the same type of control mechanism will operate the cylinder of Figure 3 in the same manner as heretofore described with regard to the cylinder of Figure 1.

Figure 4:
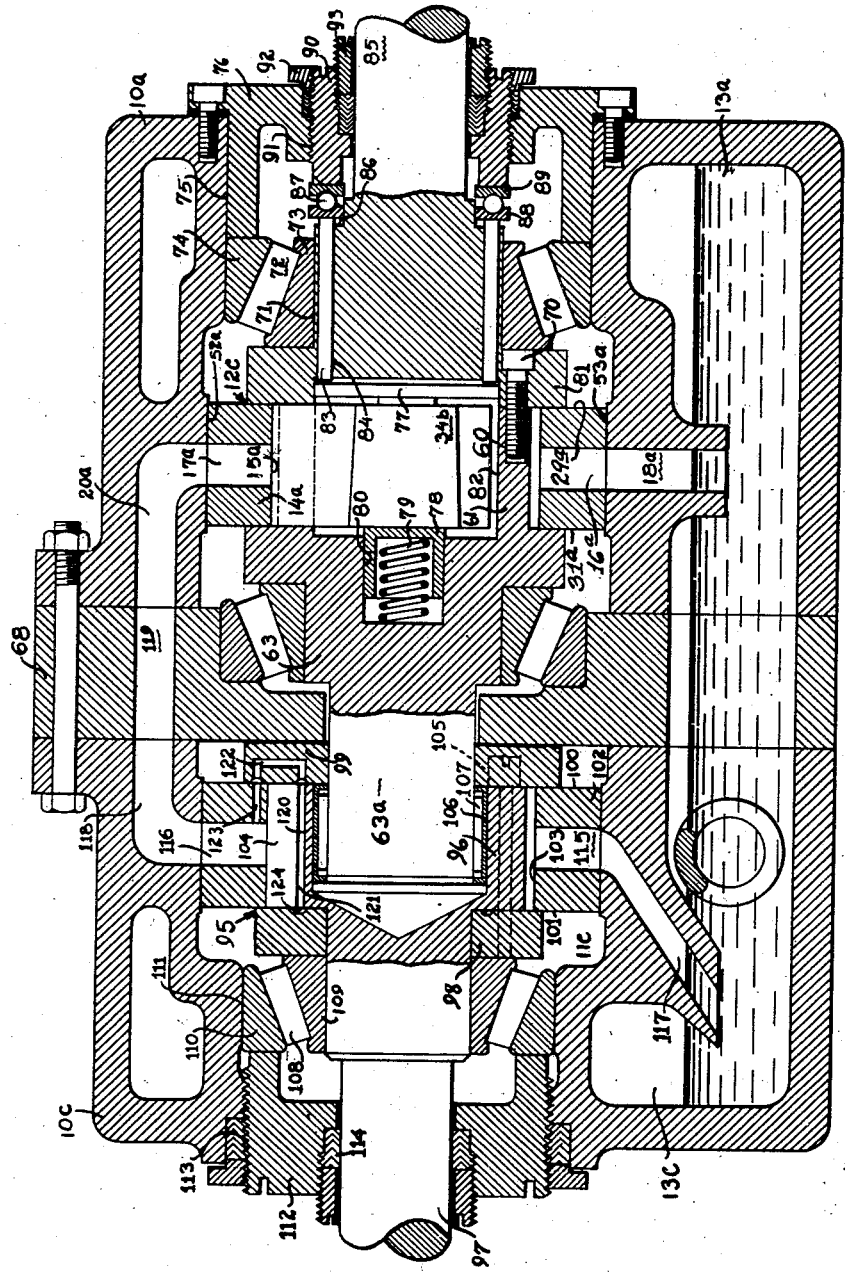
Figure 4 is a longitudinal cross-sectional view of a modified pump arrangement wherein the mechanical actuator of the pump of Figure 3 is used in the motor of the transmission and hydraulically actuated vanes are used in the pump of the transmission.

In Figure 4 there is shown another modified arrangement of a hydraulic transmission using vane pumps as the pumping unit as well as the motor unit. The modifications heretofore described have provided a mechanical actuating device for maintaining the vanes of the vane pump in engagement with the cylinder wall. When such a mechanical device is used there is no problem of collapsing of the vane of the pump. However, a hydraulic pressure fluid can be used to maintain the vanes in engagement with the cylinder walls to replace the mechanical actuator heretofore described. Figure 4 discloses a hydraulic transmission wherein the motor unit is provided with a mechanical actuator for maintaining the vanes in engagement with the cylinder walls while the pumping unit is provided with hydraulic means for performing this function.

The motor unit 12c of Figure 4 is identical with the motor unit 12a of Figure 3 and therefore it is not believed that description of this unit is necessary. The only difference between the motor unit 12c of Figure 4 and the motor unit 12a of Figure 3 is that the reduced diameter portion 63 of the rotor 60 of the motor unit 12c has an extended portion 63a which protrudes through the dividing plate 68 into the pumping chamber and upon which the rotor of the pumping unit is bearinged.

The pumping unit 95 of the hydraulic transmission disclosed in Figure 4 consists of a casing 10c having an internal working chamber 11c within which the pumping mechanism is positioned. The casing 10c is provided with a fluid reservoir chamber 13c in the lower portion thereof.

The pumping unit 95 consists of a rotor 96 having an integral drive shaft 97. Closure plates 98 and 99 are provided on opposite faces of the rotor 96 for engaging the planar surfaces 100 and 101 of the cylinder 102. The cylinder 102 has a bore 103 within which the rotor 96 is positioned. The rotor 96 carries a plurality of vanes 104 positioned radially within suitable slots provided in the rotor 96 for cooperating with the rotor and the cylinder to produce a vane type pump unit. The rotor elements 98, 96 and 99 are secured in their proper relation by means of the bolts 105.

The rotor 96 is provided with an internal bore 106 which carries a plurality of needle bearings 107 for supporting the rotor 96 upon the extending portion 63a of the motor unit 12c. The drive shaft 97 of the pumping unit 95 carries a tapered roller bearing 108, the inner race 109 of which is carried upon the drive shaft 97 and the outer race 110 being carried within a bore 111 provided in the casing 10c. The tapered bearing 108 is positioned within the bore 111 by means of the plug 112 threaded into the casing 10c and sealed by means of the packing glands 113 and 114.

The cylinder 102 is provided with an inlet passage 115 and with an outlet passage 116. The inlet passage 115 is in communication with a passage 117 which communicates with the fluid within the reservoir 13c. The outlet passage 116 communicates with a passage 118 provided in the casing 10c which is in alignment with a passage 119 provided in the dividing plate 68 whereby liquid from the pumping unit 95 is conducted to the inlet passage 20a of the motor unit 12c.

The vanes 104 are shorter than the slots 120 within which they reciprocate in the cylinder 102. A space 121 is therefore provided between the lower edge of the vane 104 and the bottom of the slot 120. This space 121 is in communication with the passage 122 provided in the closure plate 99, and which passage is in turn in communication with a passage 123 provided in the wall of the cylinder 102. The passage 122 communicates with an annular groove 124 provided adjacent the space 121 for distributing fluid conducted to the groove 124 by means of the passages 123 and 122 from the discharge passage 116 of the cylinder 102. The passages 123 and 122 thus permit fluid at discharge pressure to be conducted to the under side of each of the vanes 104 and retain the vanes in engagement with the cylinder wall 103.

When the hydraulic transmission is not in operation there is substantially no pressure in the discharge passage 116 so that at this time the vanes 104 will be collapsed. However, as soon as the pump unit 95 begins rotation centrifugal force will cause the vanes 104 to move outwardly into engagement with the cylinder wall 103 to establish pumping chambers and thereby produce pressure in the discharge passage 116. Since the motor unit 12c has the vanes thereof in constant engagement with the cylinder wall the pressure will be immediately built up in the passage between the pumping unit 95 and the motor unit 12c thereby substantially immediately applying pressure to the under side of the vanes 104 of the pumping unit 95.

The arrangement of Figure 4 thus provides a hydraulic transmission using both hydraulic and mechanical means for actuating the vanes of the vane pumps of the transmission.

In Figure 5 there is disclosed a hydraulic transmission using vane pumps as the pumping device and the motor wherein the vanes of the pumping and motor mechanisms are maintained in engagement with their respective cylinder walls by means of hydraulic pressure. When a pumping mechanism of this type is not operating there is substantially no pressure existing within the mechanism to retain the vanes of the pump and the motor in position in engagement with the cylinder walls whereby the vanes can collapse. When the pump of the transmission starts rotation the vanes of the pump will be moved outwardly by centrifugal force into engagement with the cylinder wall of the pump to deliver fluid to the motor. However, since the motor is standing idle the vanes will still be in a collapsed condition so that fluid delivered to the motor can pass through the same without causing rotation thereof. Since the fluid is free to pass through the motor there will be no pressure built up either in the discharge side of the pump or on the inlet side of the motor. The lack of fluid pressure on the discharge side of the pump leaves the vanes of the motor without means for moving the same into engagement with the cylinder wall of the motor. Under these conditions the motor might never start. The apparatus of Figure 5 discloses means for insuring development of pressure in the discharge side of the pumping mechanism for transmission to the under side of the vanes of the motor before the fluid is directed through the motor for rotating the same. Once pressure has built up in the discharge side of the pumping mechanism and has been transmitted to the vanes of the motor, the vanes will remain in their extended position and the fluid can then circulate through the motor for operating the same.

In this modification the casing 10d encloses a pumping mechanism 125 which is like the pumping mechanism 95 disclosed in Figure 4 wherein the hydraulic pressure from the discharge side of the pumping mechanism 125 is conducted to the under side of the vanes for applying pressure thereto. A similar mechanism 130 is enclosed within the casing 10d', which mechanism is the motor of the hydraulic transmission. The pumping mechanisms 125 and 130 are separated by a dividing wall 131 which has a rotatable valve 132 positioned therein. The valve 132 is provided with a passage 133 for connecting the discharge passage 134 from the pump 125 with the inlet passage 135 for the motor 130. Since the pumping mechanisms 125 and 130 are similar in structural details to the pumping mechanism 95 described with regard to Figure 4 a detailed description of the mechanism is not believed essential and the same numerals will therefore be used on the mechanisms of Figure 5 to identify elements of like character and the suffix "d" will be used.

The rotors 96d of the pump and motor 125 and 130 are bearinged upon a stub shaft 136 secured within the dividing wall 131. The rotors 96d are carried upon the stub shaft 136 by the needle bearings 106d in the same manner as the rotor 96c is carried upon the stub shaft 63a, as disclosed in Figure 4. The only difference between the structure of Figure 4 and that of Figure 5 is that the stub shaft 136 is secured to the wall 131 and thus is able to carry both rotors of the pump 125 and the motor 130.

The end closure plate 99d is provided with a passage 137 which communicates with an annular groove 138 in the outer face of the closure plate 99d. The groove 138 communicates with a plurality of passages 139 extending through the dividing wall 131 into the motor chamber. The end closure plate 99d of the motor 130 is provided with a plurality of passages 140 which communicates with annular grooves 141 and 142 positioned in opposite faces of the end closure plate 99d. The passages 139 in the dividing wall 131 communicate with the annular groove 141 while the annular groove 142 communicates with the space 121d provided beneath the lower edge of the vane 104d of the motor 130. The hydraulic interconnection between the pump 125 and the motor 130 just described is the only structural difference between the units and the unit 95 described with regard to Figure 4.

However, in order to insure positive pressure to the space 121d of the motor 130 it is necessary that pressure shall be built up in the discharge passage 134 from the pump 125 before fluid is permitted to flow through the inlet passage 135 to the pump 130. The valve 132 performs the function of shutting off the connection between the passages 134 and 135 when the pressure in the passage 134 is below a predetermined level.

The control apparatus for the valve 132 consists of a piston 143 slidable within a cylinder 144 formed integral with the casings 10d and 10d', one-half the cylinder being carried by the casing 10d, while the other half is carried by the casing 10d'. The piston 143 is provided with a gear rack 145 extending longitudinally thereof, and which is in engagement with a gear or gear segment 146 carried by the valve 132. A spring 147 is compressed between the piston 143 and an adjusting screw 148, the adjusting screw being carried by the wall of the cylinder 144. The spring 147 urges the piston in a leftward direction as viewed in Figure 5 to locate the valve 132 in a position to close the connection between the passages 134 and 135. A passage 149 connects a recess 150 in the end of the cylinder 144 with the discharge passage 134 from the pump 125 so that the pressure in the discharge passage 134 is conducted to the left end of the piston 143.

When the transmission is idle the position of the valve 132 and the piston 143 is as disclosed in Figure 5. When the pump unit 125 begins rotation fluid will be delivered into the chamber 134 since the vanes will be thrown outwardly centrifugally by rotation of the rotor 96d, thus delivering fluid under pressure into the chamber 134. When the pressure within the chamber 134 becomes equal to or greater than resistance of the spring 147 the piston 143 will be moved in a rightward direction, whereby the rack 145 will rotate the gear 146, and thus rotate the valve 132 to place the passage 133 in flow relationship between the passages 134 and 135.

As the pressure builds up in the passage 134 it also builds up in the communicating passages 137, 139 and 140 to deliver fluid under pressure into the space 121d below the vane 104d in the motor 130. Since the valve 132 cannot open until a predetermined pressure has been reached in the chamber 134, this predetermined pressure will have been transmitted to beneath the vanes 104d of the motor 130 and thus insuring the engagement of their outer ends with the cylinder wall 103d of the motor 130. Since the vanes are in their proper position in engagement with the cylinder wall delivery of fluid from the pumping unit 125 to the motor unit 130 can then be established.

In Figure 6 there is represented in diagrammatic form the use of a pilot pump for supplying pressure to the passage 139 within the dividing wall 131 of the apparatus of Figure 5. The pilot pump 155 may consist of a conventional gear pump for withdrawing liquid from the fluid reservoir 13d and delivering the same through the conduit 156 into a suitable port within the dividing wall 131 of the apparatus of Figure 5, for conducting the fluid to the passage 139. Since the passage 139 communicates with the annular grooves 138 and 141 liquid delivered by the pilot pump will be carried through the passages 137 and 140 to beneath the vanes 104d of the pump 125 and the motor 130. When the pilot pump is used it is of course understood that the passages 123d and 122d are not used.

The pilot pump is of course placed upon the drive shaft for the pump unit 125 so that when the pump unit 125 is driven by a suitable electric motor or other conventional apparatus the gear pump will provide positive delivery of fluid to the spaces below the vanes 104d.

A by-pass passage 157 connects the conduit 156 with the reservoir 13d within the casing 10d in which there is positioned a by-pass valve 158 for regulating the pressure developed within the conduit 156 before excess fluid is by-passed to the reservoir 13d. This arrangement permits the pilot pump to produce a substantially constant pressure within the conduit 156 and thus a substantially constant pressure below the vanes 104d of both the pump unit 125 and the motor unit 130.

Since the pressure supplied by the pilot pump 155 is relatively constant this pressure can be used as a safety control feature as to the maximum pressure developed within the transmission by means of the pump unit 125. The pressure within the discharge chamber 134, acting upon the outer ends of the vanes 104d, always tends to collapse the vanes against the pressure existing within the space 121d provided below the vanes. The pressure delivered by the pilot pump will thus regulate the maximum pressure developed by the pumping unit 125 since the ratio of the pressure on the top of the vane to the pressure on the bottom of the vane, with respect to their comparable areas, will determine the pressure differential between the space below the vane and the pressure on top of the vane before the pressure on top of the vane will force the vane downwardly against the pressure on the bottom of the vane, thereby tending to collapse the same and preventing further delivery of the fluid by the pumping unit 125.

It is of course to be understood that either the pumping unit or the motor unit of the hydraulic transmission of any of the modifications disclosed have their eccentricities variable in order to vary the output speed of the transmission.

Having thus fully described my invention, what I claim as new and desire to secure by Letters Patent, is:

1. A hydraulic transmission consisting of a pair of substantially identical unit structures each of which consists of a main housing unit having an open end, a casing for a vane type power unit disposed within said housing and integral therewith, a reservoir chamber within said housing formed between the walls of said housing and said casing and having an open end wall, a vane type power unit mounted within said casing, a power shaft for said power unit extending through a common wall for said casing and said housing and journalled therein, a partition wall plate forming an end closure wall for both of said housings to separate the same into independent power units, said unit structures being mounted upon opposite sides of said partition wall with said chamber openings adjacent opposite faces of said partition wall, and passages through said partition wall for establishing fluid passage between said power units and between the reservoir chambers in said housings.

2. A hydraulic transmission comprising a pair of substantially identical unit structures each of which consists of a main housing unit having an open end, a casing for a vane type power unit disposed within said housing and integral therewith, a reservoir chamber within said housing formed between the walls of said housing and said casing and having an open end wall, a vane type power unit mounted within said casing, a power shaft for said power unit extending through a common wall for said casing and said housing and journalled therein, a partition wall plate forming an end closure wall for both of said housings to separate the same into independent power units, a flow passage in said casing connecting said reservoir to said vane type power unit, a second flow passage in said casing from said vane type power unit to the exterior of said casing and terminating in the same plane as said open end wall, said unit structures being mounted upon opposite faces of said partition with said second passages and said chamber openings adjacent opposite faces of said partition, and passages through said partition interconnecting the reservoir chambers in said housings and said second flow passages, whereby fluid circuit flow is established for the hydraulic transmission.

3. A hydraulic transmission comprising a pair of substantially identical unit structures each of which consists of a main housing unit having an open end, a casing for a vane type power unit disposed within said housing and integral therewith, a reservoir chamber within said housing formed between the walls of said housing and said casing and having an open end wall, a vane type power unit mounted within said casing including a rotor having a power shaft integral therewith and extending through a common wall for said casing and said housing and journalled therein, a partition wall plate forming an end closure wall for both of said housings to separate the same into independent power units, a bearing shaft extending through said wall plate and upon which the rotor of the power unit is journalled, a flow passage in said casing connecting said reservoir to said vane type power unit, a second flow passage in said casing from said vane type power unit to the exterior of said casing and terminating in the same plane as said open end wall, said unit structures being mounted upon opposite faces of said partition with said second passages and said chamber openings adjacent opposite faces of said partition, and passages through said partition interconnecting the reservoir chambers in said housings and said second flow passages, whereby fluid circuit flow is established for the hydraulic transmission.

4. A hydraulic transmission having a pair of vane pumps operating as the power unit and the motor unit thereof, means for conducting fluid pressure from the discharge side of the power unit to the under side of the vanes of both of said units for maintaining the outer ends of the vanes in engagement with their respective cylinder walls, and means for establishing positive pressure in the discharge side of said power unit to position the outer ends of the vanes in engagement with their respective cylinder walls before fluid is conducted to the motor unit for actuation thereof.

5. A hydraulic transmission having a pair of vane pumps operating as the power unit and the motor unit thereof, means for conducting fluid pressure from the discharge side of the power unit to the under side of the vanes of both of said units for maintaining the outer ends of the vanes in engagement with their respective cylinder walls, and means for establishing positive pressure in the discharge side of said power unit to position the outer ends of the vanes in engagement with their respective cylinder walls before fluid is conducted to the motor unit for actuation thereof, said last mentioned means establishing circuit flow from the power unit to the motor unit upon establishment of a predetermined pressure on the discharge side of the power unit.

6. A hydraulic transmission having a pair of vane pumps operating as the power unit and the motor unit thereof, means for conducting fluid pressure from the discharge side of the power unit to the under side of the vanes of both of said units for maintaining the outer ends of the vanes in engagement with their respective cylinder walls, means for establishing positive pressure in the discharge side of said power unit to position the outer ends of the vanes in engagement with their respective cylinder walls before fluid is conducted to the motor unit for actuation thereof, said last mentioned means comprising a valve positioned in the flow passage between the power unit and the motor unit, and means for actuating said valve in response to the pressure in the discharge side of said power unit.

7. A hydraulic transmission comprising a pair of substantially identical unit structures each of which consists of a main housing unit having an open end, a casing for a vane type power unit disposed within said housing and integral therewith, a reservoir chamber within said housing formed between the walls of said housing and said casing and having an open end wall, a vane type power unit mounted within said casing, a power shaft for said power unit extending through a common wall for said casing and said housing and journalled therein, a partition wall plate forming an end closure wall for both of said housings to separate the same into independent power units, a flow passage in said casing connecting said reservoir to said vane type power unit, a second flow passage in said casing from said vane type power unit to the exterior of said casing and terminating in the same plane as said open end wall, said unit structures being mounted upon opposite faces of said partition with said second passages and said chamber openings adjacent opposite faces of said partition, passages in said partition interconnecting the reservoir chambers in said housings and said second flow passages, whereby fluid circuit flow is established for the hydraulic transmission and one of said units acts as a power unit while the other acts as a motor unit, means for conducting fluid pressure from the discharge side of said power unit to the under side of the vanes of both of said units to place the same in operative position in each of the units, valve means in said second flow passage for controlling fluid flow therethrough, and pressure actuated means responsive to discharge pressure of said unit acting as a power unit for operating said valve means whereby to cause a positive fluid pressure to be built up in said power unit for delivery to the under side of the vanes before interconnecting the same for full delivery of pressure fluid therebetween.

WARREN R. TUCKER.